United States Patent
Baxter, Jr.

[11] Patent Number: 6,023,223
[45] Date of Patent: Feb. 8, 2000

[54] EARLY WARNING DETECTION AND NOTIFICATION NETWORK FOR ENVIRONMENTAL CONDITIONS

[76] Inventor: John Francis Baxter, Jr., 980 Cape Marco Dr., Marco Island, Fla. 34145

[21] Appl. No.: 09/271,667

[22] Filed: Mar. 18, 1999

[51] Int. Cl.[7] .................................................. G08B 1/00
[52] U.S. Cl. ...................... 340/531; 340/539; 340/511; 340/517; 340/825.06; 702/1
[58] Field of Search ................... 340/531, 539, 340/825.06, 511, 517; 370/352; 455/557, 404, 426; 702/1

[56] References Cited

U.S. PATENT DOCUMENTS

| | | | |
|---|---|---|---|
| 5,808,916 | 9/1998 | Orr et al. | 364/578 |
| 5,838,252 | 11/1998 | Kikinis | 340/825.44 |
| 5,848,378 | 12/1998 | Shelton et al. | 702/3 |
| 5,857,967 | 1/1999 | Frid et al. | 600/301 |
| 5,908,383 | 6/1999 | Brynjestad | 600/300 |
| 5,917,405 | 6/1999 | Joao | 340/426 |

*Primary Examiner*—Donnie L. Crosland
*Attorney, Agent, or Firm*—Anton J. Hopen; Smith and Hopen, P.A.

[57] ABSTRACT

An early warning detection and notification network for monitoring environmental conditions comprising a plurality of remotely located environmental sensors having a communications uplink to one or more earth orbiting satellites or other wireless transmission means, a downlink interface to a database server having one or more data tables holding environmental data and a communications interface between the database server and the Internet wherein the sensors periodically upload environmental condition data to the satellite, the satellite downloads the condition data to the database server, the communications interface provides access to the condition data through the Internet. End-users access the system through the Internet and retrieve real-time data on various environmental conditions based on a database query. The query results may be grouped by the geographic region, the type of environmental data or a combination of both. End-users may also employ preset trigger levels for certain environmental conditions. When the trigger levels are exceeded, the end-user is notified by email, pager, automated voice response or the like.

9 Claims, 3 Drawing Sheets

EARLY WARNING DETECTION AND NOTIFICATION NETWORK FOR ENVIRONMENTAL CONDITIONS

FIELD OF INVENTION

The present invention relates generally to an information network, and more particularly to an Internet-accessible system for retrieving, storing and displaying real-time environmental data.

BACKGROUND OF THE INVENTION

This invention is directed to a novel Internet-based network of remotely located sensors that transmit data to a transmission means which may comprise earth orbiting satellites, wireless radio communications or the like. The system provides real-time global coverage of various environmental conditions including, but not limited to, hydrocarbon concentrations, water temperature, wind speed, plate tectonics, atmospheric pressure, toxin concentrations, and the like. Additional applications include, but are not limited to, tracking of animal migrations and densities, deforestation, polar ice cap activity, red tide and other geological, biological, atmospheric and oceanic conditions. Data from the sensors is stored in one or more database servers accessible through the Internet by standard protocols such as HTML and HTTP. End-users are able to submit Boolean queries to monitor a variety of environmental conditions. The relational database permits query results to be grouped by geographic location, environmental data type or a combination of both.

Satellite monitoring of environmental conditions is well known in the art as illustrated by this inventor's U.S. Pat. No. 5,532,679 entitled "Oil Spill Detection System." Weather satellites utilize cameras and other instruments pointed toward the earth's atmosphere. They provide advance warning of severe weather and are a great aid to weather forecasting. The National Aeronautics and Space Administration ("NASA") launched the first weather satellite, Television Infrared Observation Satellite ("TIROS") 1, on Apr. 1, 1960. TIROS 1 transmitted approximately 23,000 photographs of the earth and its atmosphere. NASA operates the Geostationary Operational Environmental Satellites ("GOES"), which are in geostationary orbit. GOES provides information for weather forecasting, including tracking storms. GOES is augmented by Meteosat 3, a European weather satellite also in geostationary orbit. The National Oceanic and Atmospheric Administration (NOAA) operates two satellites that collect data for long-term weather forecasting. These two satellites are not in geostationary orbits; rather, their orbits carry them across the poles at a relatively low altitude.

Satellite monitoring provides a communications link for remotely located instruments to upload environmental conditions to a monitoring station. Traditional satellites, called geosynchronous satellites, orbit at 22,300 miles above the earth's surface and routinely pass over a remote area every two hours. However, critical environmental conditions, such as oil spills, benefit from early detection as significant dispersion can occur within two hours.

For sensors that are in sufficient proximity to ground-based communications, a plurality of different wireless communications may be utilized including analog cellular, digital cellular, global system for mobile communications, personal communications service and specialized mobile radio. However, for remotely located environmental sensors outside the range of traditional wireless communications, another communications pathway may be required.

A possible solution is the use of low earth orbiting satellites ("LEOs") positioned from 435 to 1000 miles from the earth. Because placing satellites lower in orbit lowers the area to which each satellite transmission reaches a greater number of satellites are required. A low earth orbit minimizes the amount of fuel needed. In addition, a satellite in LEO can obtain clearer surveillance images and can avoid the Van Allen radiation belts, which contain harmful high-energy particles. It needs less powerful signals to communicate with the earth than satellites with higher orbits. A signal to or from a low earth orbit also reaches its destination more quickly, making LEO satellites especially good for transmitting data.

A global network of LEOs can provide continuous real-time coverage of environmental conditions through a satellite uplink from remotely located instruments. The satellite then receives the data and transmits it to a monitoring station. However, access to data archived at an individual monitoring station may be subject to the proprietary communications interface used by that station. Furthermore, if data for water temperature and salinity concentrations for a certain geographic area is sought to be compared, it is difficult to integrate data from multiple sources. A possible solution to this problem is to provide the data through a unified communications portal.

The Internet is a connection of multiple networks. The networks inter-operate over a suite of standardized protocols including TCP/IP, which sends data over the Internet in packets. Internet access to certain environmental conditions is also available, most notably in the form of weather information. Most information on the Internet is provided through a standardized navigation system called the World Wide Web ("WWW"). The WWW is a system that links documents such as home pages on distant computers together. HTML is the standard format for providing information on the WWW. The HTML format supports the use of forms by which databases may be accessed through a variety of search languages including Boolean, SQL and the like. A server-side executable program then processes the search and displays the results in HTML format.

Another problem experienced in environmental monitoring is the drain on human resources to continually monitor various condition levels for potential problems. An agency may require an employee to "stand watch" over a monitoring console in the event an abnormal condition is detected such as a possible earthquake or oil spill. A small amount of tectonic movement may not require human response just as a minute amount of hydrocarbons detected in an ocean may not signify an oil spill. Furthermore, notification of problem conditions may be limited to the monitoring station which must then relay the information to the appropriate response entity. This communications relay may cost critical time better utilized in preventing or remedying the situation.

Consequently, there is a need in the art for a global monitoring system that provides continuous real-time coverage of environmental conditions.

There is a further need in the art for a global monitoring system wherein a plurality of differing environmental conditions may be easily accessed for any geographic region.

There is a further need in the art for a monitoring system that provides easy access to historical data on past and present environmental conditions.

There is a further need in the art for a threshold notification system whereby when predefined environmental values are met, an automatic notification is issued to the proper authority or user.

However, in view of the prior art in at the time the present invention was made, it was not obvious to those of ordinary skill in the pertinent art how the identified needs could be fulfilled.

SUMMARY OF THE INVENTION

The present invention solves significant problems in the art by providing an Internet-based global network for retrieving, storing and displaying real-time environmental data comprising a plurality of remotely located environmental sensors having a communications uplink to one a communication relay, a downlink interface from the satellite to a database server having one or more data tables holding environmental data and a communications interface between the database server and the Internet wherein the sensors periodically upload environmental condition data to the satellite, the satellite downloads the condition data to the database server, the communications interface provides access to the condition data through the Internet. End-users access the system through the Internet and retrieve real-time data on various environmental conditions based on a database query. The query results may be grouped by the geographic region, the type of environmental data or a combination of both. End-users may also employ preset trigger levels for at least one or more environmental conditions. When the trigger levels are exceeded, the end-user is notified by email, pager, automated voice response or the like.

The above and other objects of the invention are achieved in the embodiments described herein by a plurality of remotely located environmental sensors having a communications uplink to one or more earth orbiting satellites or radio transmission means, a downlink interface from the satellite to a database server having one or more data tables holding environmental data and a communications interface between the database server and the Internet wherein the sensors periodically upload environmental condition data to the satellite, the satellite downloads the condition data to the database server, the communications interface provides access to the condition data through the Internet.

A diagnostic uplink from the remotely located environmental sensor may be employed to ensure that the remotely located sensor is functioning properly. In order to conserve data bandwidth, the diagnostic uplink may transmit sensor functionality status at predetermined intervals. Alternatively, a diagnostic downlink to the remotely located environmental sensor may be utilized wherein the functionality of the sensor may be remotely audited on command. This option may be particularly useful once a large variation in environmental conditions are detected. Upon detecting such a large variation, the system may automatically command the sensor to initiate a diagnostic test to validate the proper functioning of the device and the resultant validity of the data.

In a preferred embodiment, the communications interface comprises an HTML-based form linked to the data tables wherein a search posted through the form is queried against the data tables and a result page is posted in HTML format. An advantage of using the HTML protocol is the widespread adoption of the standard. The HTML protocol is utilized by browsers which are graphical interfaces between users on the Internet, and more specifically, the World Wide Web ("WWW").

Alternatively, a proprietary client program could be distributed for accessing the environmental data. However, multiple versions of a client program may be required to operate on differing operating systems.

In order to facilitate the retrieval of data, a preferred embodiment of the invention utilizes a Boolean search form. Boolean searches refer to an algebraic combinatorial system treating variables, such as propositions and computer logic elements, through the operators AND, OR, NOT, IF, THEN, and EXCEPT. The use of such search logic permits an end-user to include or exclude specific data. For example, using a Boolean search, the end-user may choose to retrieve a plurality of environmental conditions for a single geographic location. Alternatively, a Boolean search may be employed to access one or more specific environmental conditions at a plurality of geographic locations for comparison.

Similar to any network, capacity and bandwidth are finite. Although all data could be stored on a single central processing unit ("CPU") driven server, a preferred method of operation is to fashion a cluster of inter-operating systems. For example, a single server may be utilized for retrieving, storing and serving data relating to surface water temperature around the globe. This server utilizes separate processing and storage resources than another server that might retrieve, store and serve data relating to plate tectonics. Utilizing this clustering arrangement, if one server malfunctions, all other data is still available. Due to the critical nature of many forms of environmental data, it is also preferable that system redundancy is utilized wherein data on one server is continually mirrored to another server. Should the first server go down, the second server immediately goes on line until the first server is repaired.

It is well known that the Internet is a shared resource wherein as the number of users and activity increases, speed and responsiveness diminish. In a preferred embodiment of the invention, a non-shared, dedicated connection is employed between the satellite downlink and the database server. This dedicated connection insures the availability and integrity of continuous real-time data even if high Internet traffic slows down the communication link between the end-user and the database server. Otherwise, remotely collected data might "bottleneck" at an Internet access point, thereby negating the benefits of continuous global coverage by orbiting satellites.

A particularly important feature of the invention is the archiving of historical data gathered by network. Queries may be conducted not only to include geographic location and the type of environmental condition, but also how those values compare to previously recorded values. In particular, global warming has been a concern of great interest. However, scientists wishing to study the interrelation of various environmental conditions must cross-reference multiple databases, each storing concentrations of carbon dioxide, methane, nitrous oxide, and chlorofluorocarbons. This is laborious and it becomes difficult to correlate various factors, or a combination of factors which may contribute to abnormal or unexpected conditions. Historical data accessible through a single Internet portal and correlated through a variety of searches helps researchers devise and validate theoretical models of environmental conditions and the human impact on the same.

A well known technology utilized by Internet users is server-side push technology for Internet channels. This technology allows the server to update data on the client side as the data changes. Push technology may be utilized for end-users wishing to continuously monitor various environmental conditions without requiring the end-user to manually refresh the data on the client-side. An alternative to utilizing a graphical interface for pushing new data to the end-user may be employed in the form of electronic mail ("email"). Thus, a periodic intervals, new data gathered by the satellites is emailed to the end-user for analysis. This method permits the end-user to create a personal archive of historical data for a particular query.

Many end-users may only wish to be notified if an environmental condition becomes abnormal or reaches a level that requires human intervention. In a preferred embodiment, end-users store profiles online which contain predefined queries and threshold triggers. For example, a disaster response agency may wish to monitor hydrocarbon concentrations in the Gulf of Mexico. That agency accesses the system through a web page. The web server automatically identifies the agency through an Internet cookie or by a login process. The agency then enters the target hydrocarbon concentration in an HTML form which posts the results to the web server database. Remotely located oil detection buoys in the Gulf of Mexico periodically relay hydrocarbon concentrations to orbiting satellites which then transmit the data to the web server. When a buoy transmits a hydrocarbon concentration equal to, or greater than the target concentration stored by the agency, the web server issues a notification to the agency. This notification may be an email, an alphanumeric page or an automated voice-response message. Thus, the agency is automatically notified when certain environmental conditions exist that may require human response.

Furthermore, by determining the geographic location of the triggered concentration, a response agency in that locality may be notified specifically. In addition, the automated response permits a large number of end-users to be notified simultaneously in the event of a potentially catastrophic condition, thereby giving response agencies additional time to react appropriately.

Accordingly, it is an object of the present invention to provide a global monitoring system that provides continuous real-time coverage of environmental conditions.

It is another object of the present invention to provide a global monitoring system wherein a plurality of differing environmental conditions may be easily accessed for any geographic region.

It is another object of the present invention to provide a monitoring system that provides easy access to historical data on past and present environmental conditions.

It is another object of the present invention to provide a threshold notification system whereby when predefined environmental values are met, an automatic notification is issued to the proper authority or user.

An advantage of the invention is that environmental data may be monitored on a real-time basis thereby providing a continuous flow of data which permits better analysis of environmental conditions and provides a fast response time in the event potentially catastrophic conditions are detected such as an oil spill.

Another advantage of the invention is that a wealth of environmental data is accessible on a global network, thereby providing an invaluable tool for researchers, response teams and public awareness regardless of their locality.

Another advantage of the invention is that critical environmental conditions that exceed a threshold trigger an immediate automated notification to the appropriate user for disaster recovery, forecasting or any similar need.

Another advantage of the invention is that a plurality of different environmental conditions may be correlated together on a single search query. This correlation provides a tool to determine how a combination of different conditions produce an end effect.

Another advantage of the invention is that historical data for a plurality of environmental conditions may be archived for retrieval at a later date. This historical data may be cross-referenced to current conditions using the database query to compare past and present conditions.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
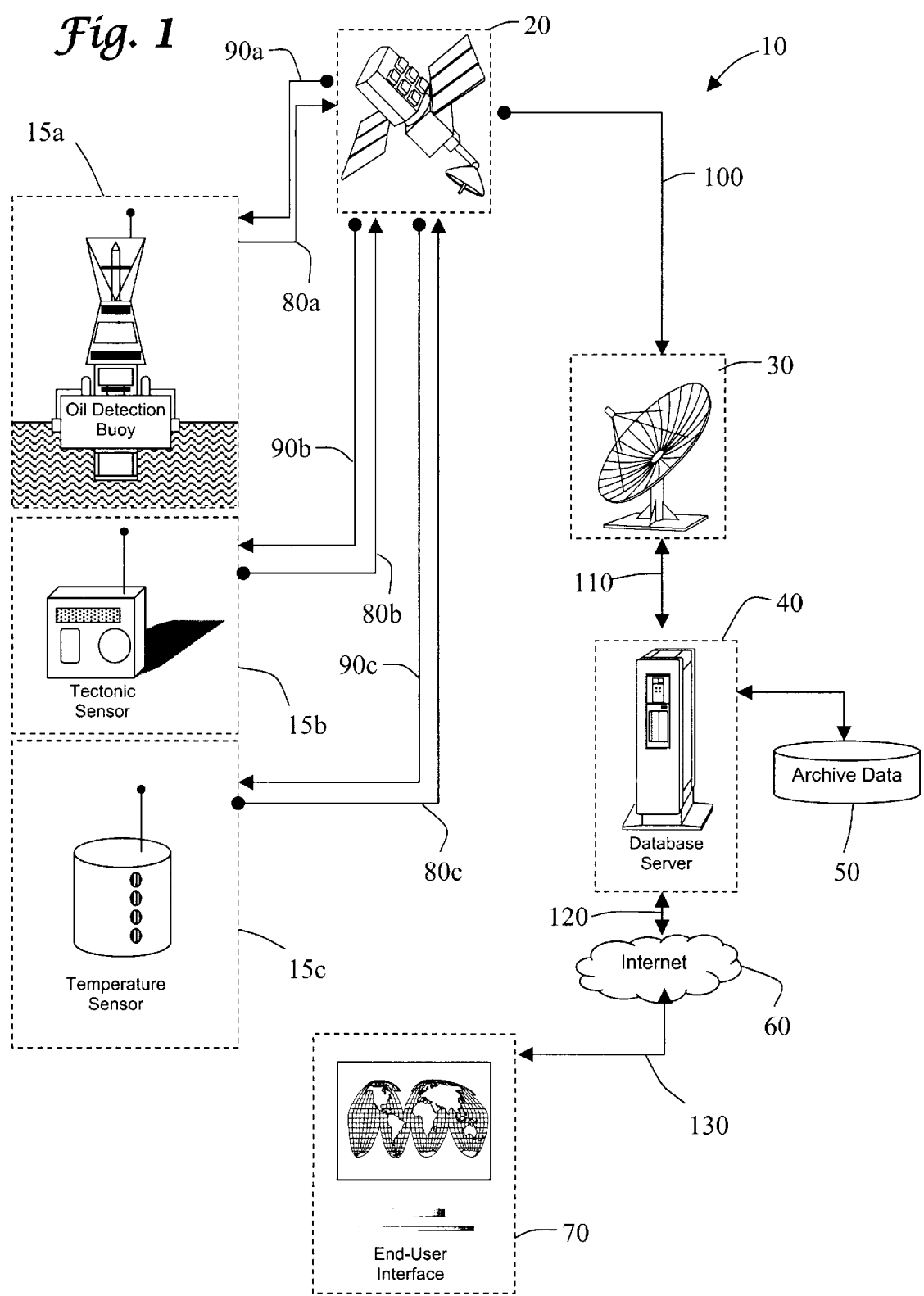
FIG. 1 is a diagrammatic view of a preferred embodiment of the global monitoring network according to the invention.

Referring initially to FIG. 1, it will there be seen that an illustrative embodiment of the present invention is denoted by the reference number 10 as a whole. A plurality of remotely located environmental sensors 15a–c send data through an uplink 80a–c to an orbiting satellite 20. A number of types of satellites may be utilized including low earth orbiting, geosynchronous, geostationary or any other suitable satellite capable of receiving transmissions from one or more environmental sensors. Additionally, other forms of wireless communication may be utilized to transmit the environmental data including, but not limited to, analog cellular, digital cellular, global system for mobile communications, personal communications service, specialized mobile radio or any other form of radio communication capable of transmitting environmental data. The remotely located sensors may include oil detection buoys 15a, tectonic sensors 15b, temperature sensors 15c or the like. On each sensor 15a–c is a communications interface for sending signals to the satellite 20. Depending on data bandwidth capacity, the remotely located sensors 15a–c may send data at predetermined intervals. For example, oil detection buoys 15a may only need to upload diagnostic data once a day to validate their proper operation and otherwise not transmit data unless a high level of hydrocarbons are detected which would signify an possible oil spill. However, a tectonic sensor 15b may transmit seismic data at higher intervals.

A satellite downlink 100 transmits the environmental data to a ground receiving station 30. A downlink interface 110 sends the data a database server 40 which stores the environmental information in a archive database 50. In a preferred embodiment, the downlink interface 110 utilizes a high-speed, dedicated data connection to the database server 40 by a T-1, T-3 or asynchronous transfer mode ("ATM") connection. It is also preferred that the database server 40 be mirrored by other servers on a global basis through a separate dedicated data connection. Mirroring of the main database server 40 permits users in differing geographic areas to access data through the shortest network connection.

A communications interface between the database server 40 and the Internet 60 provides end-user access to the data through a text or graphical end-user interface 70. The communications interface preferably utilizes a web server supporting Boolean or search query language ("SQL") capabilities. On the lower end of the spectrum, new data may be distributed through file transfer protocol as ASCII files to which the user must read text. The ASCII files could be appended as new data is retrieved from the satellites 20 in a tab-delimited, comma-delimited, or similar database format. This ASCII file then could be imported into a spreadsheet or similar database format for analysis by the end-user. However, it is preferred that data be available in HTML format directly to the end-user interface 70 and that end-users have the ability to retrieve only the specific data needed. For example, a query may request a listing of all geographic locations in the northern hemisphere wherein the atmospheric temperature dropped below −20° Celsius over the last ten days. The results might be displayed in an HTML table form or in a GIF or JPEG chart graphic generated on the server-side and posted to the end-user interface.

In a preferred embodiment, all data retrieved from the satellites 20 contains standardized reference fields comprising date, time, and geographic location. Using these reference fields, differing environmental data may be correlated against each other in a relational database. For example, data retrieved at a specific date, time, latitude and longitude for ozone concentrations may be matched against the atmospheric temperature at that same location and time. Using the reference fields, researchers are able to correlating different environment conditions and establish theoretic models of environmental interrelationships from empirical data.

A communications interface 120 connects the database server 120 to the Internet 60. The communications interface 120 is preferably a high-bandwidth connection to provide an appropriate response rate. An end-user interface 70 connects to the Internet 60 through an end-user connection 130 which may comprise any TCP/IP compliant pathway.

Remotely located sensors 15*a–c* may be pre-configured to periodically upload diagnostic information through the communications uplink 80*a–c* to insure that the sensor is properly functioning. However, it may also be desirable to obtain system status on command by a diagnostic downlink 90*a–c* wherein the satellite 20 sends a command signal to the remote sensor 15*a–c* which activates a self-diagnostic check. The results of the self-diagnostic check are then uploaded back to the satellite, and in turn to the receiving station 30. In a preferred embodiment of the invention, when critical or abnormal conditions are detected, a command signal is immediately sent through the diagnostic downlink to insure that the condition is not a false reading. This is particularly important when an expensive human response may be initiated only to discover that a sensor gave a false reading.

Figure 2:
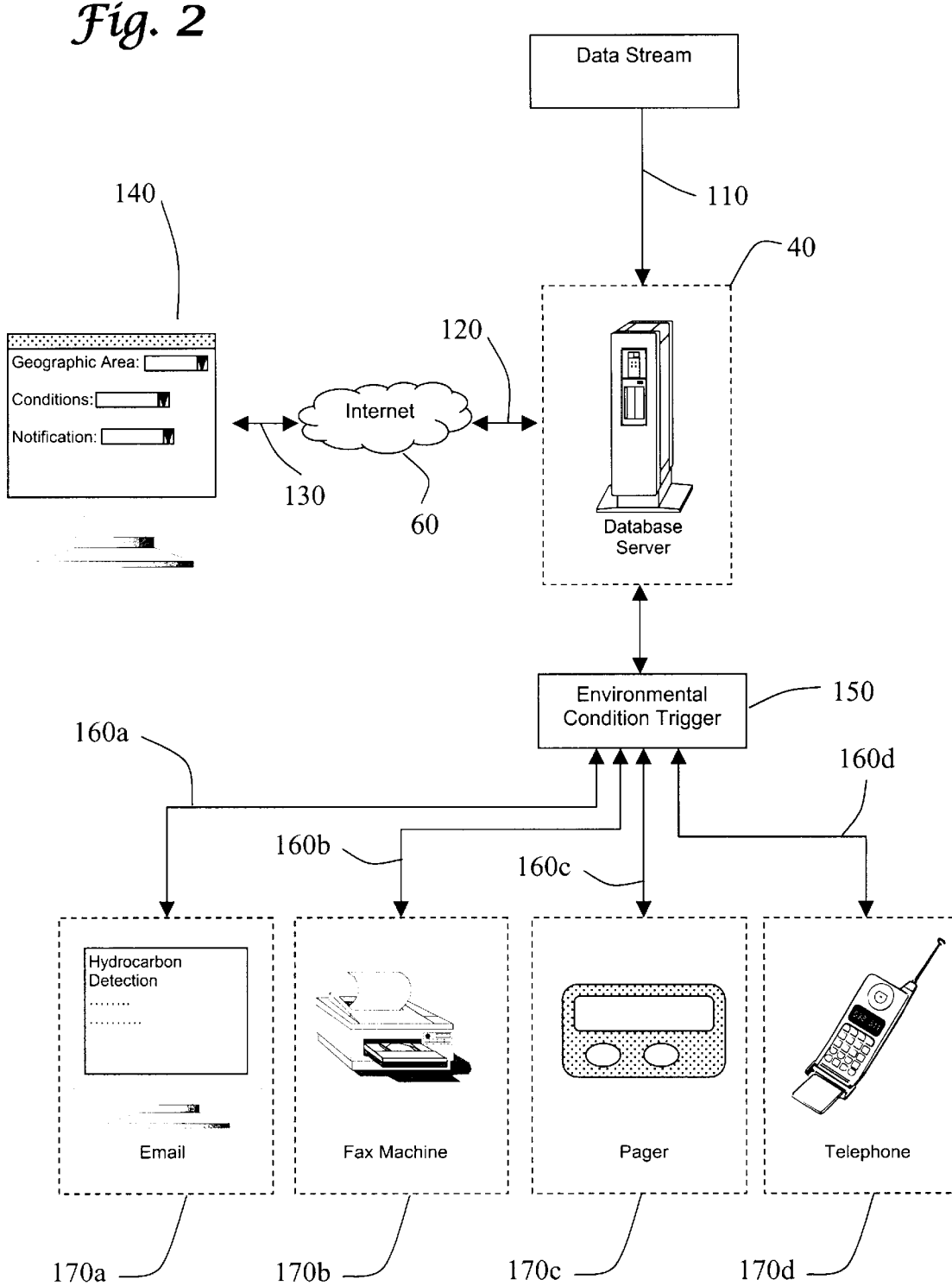
FIG. 2 is a diagrammatic view of the threshold notification system according to the invention.

FIG. 2 illustrates a conditional threshold notification feature of the invention. A trigger configuration interface 140 is provided to the end-user, preferably in HTML form. The user may be identified by use of an Internet cookie. Cookies are small text files stored on the end-user's computer which contain information on the user's preference and information. Alternatively, the user could be identified by a login process comprising a user name and a password. Once the end-user is identified in the system, the end-user may select certain environmental conditions of personal importance. For example, a oil-spill response agency may not want continuing updates on the ozone level over the Arctic. The agency may be very interested in the detection of any hydrocarbon concentrations within a three-thousand mile range of its base of operations. However, the agency may have other duties and may lack the resources to have a member continually monitor the status of remote oil detection sensors. Using the trigger configuration interface 140, the agency might select a trigger condition comprising surface hydrocarbon monitoring for its geographic area and for the type of notification requested. Such notification may include email 170*a*, fax communication 170*b*, numeric or alphanumeric paging 170*c*, or automated voice response 170*d*. These selections are stored within the database server 40. The database server 40 continually references data from the downlink interface against the trigger condition preset by the agency. When an environment condition meets the criteria preset by the agency 150, a notification 160*a–d* is sent to the pre-selected communications device 170*a–d*.

A benefit of this system is that multiple parties may be notified simultaneously when a trigger condition is met. Trigger conditions may also include threshold values. For example, minute levels of mercury are present in many bodies of water. However, should the level of mercury rise beyond a threshold value, it may signify a new source of contamination that may require immediate response.

Figure 3:
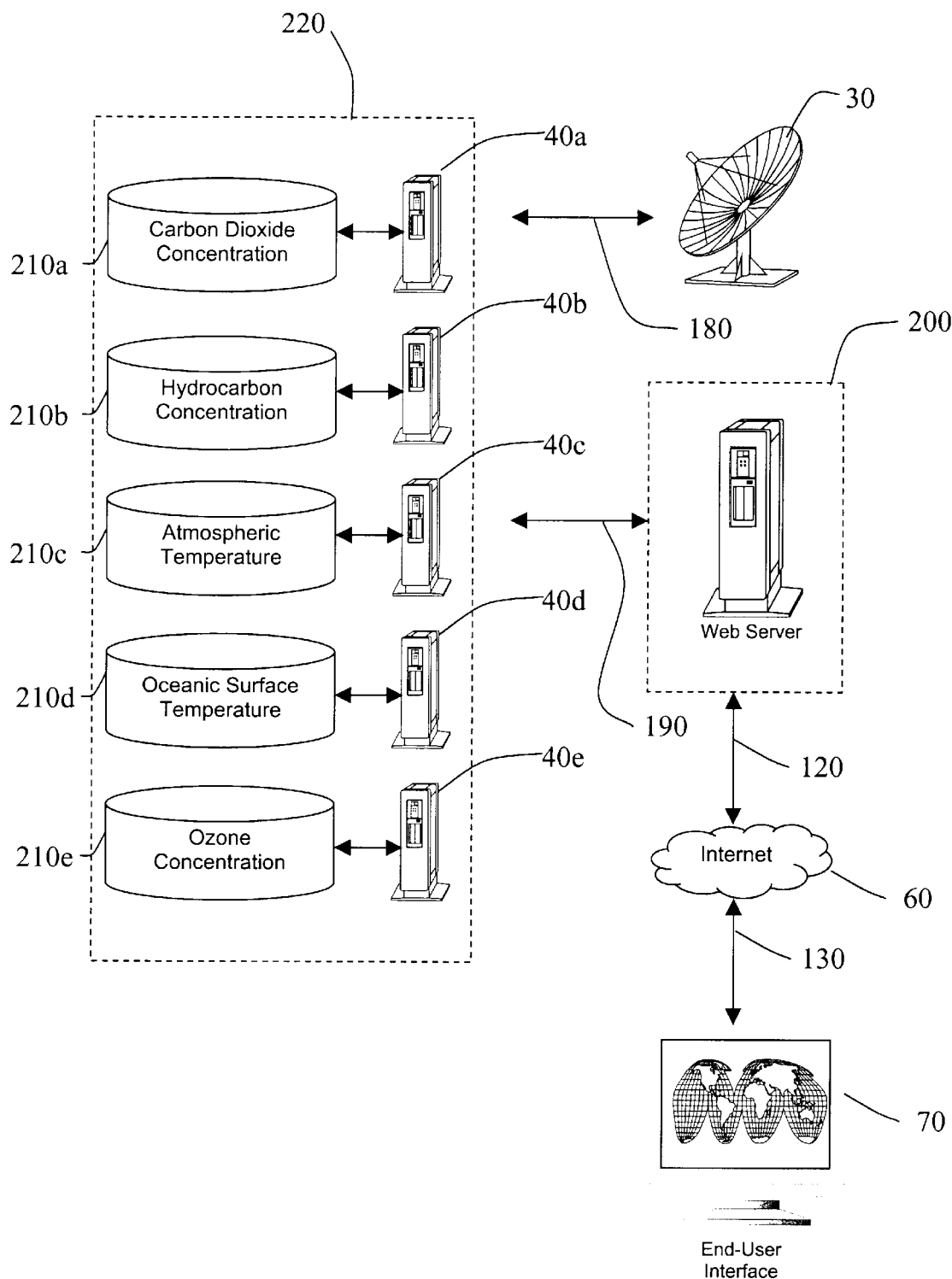
FIG. 3 is a diagrammatic preferred distribution of database resources and data bandwidth.

FIG. 3 illustrates a preferred distribution of computing resources to handle a large amount of streaming environmental data. A composite database 220 comprises individual data storage and CPU resources for each type of environmental data monitored. Alternatively, the storage and CPU resources may be distributed by geographic area. In the example illustrated, carbon dioxide concentrations are distributed through a dedicated connection 180 from the receiving station 30. The dedicated connection insures that heavy traffic on the Internet does not bottleneck the downstream flow of data from remotely located environment sensors. The carbon dioxide concentration data is stored in a corresponding database controlled by a dedicated server 40*a*. At the same time, ozone concentrations are passed to a database 210*e* and server 40*e* dedicated only to ozone concentrations. When the end-user interface 70 queries a web server 200 for carbon dioxide and ozone concentrations for a specific geographic area, both the carbon dioxide database 210*a* and the ozone concentration database 210*e* are accessed for the information. In this distributed system, should the ozone data be unavailable, the end-user would at least be able to draw information on carbon dioxide concentrations. In a preferred embodiment, all database servers are clustered for automatic fault recovery wherein if a server becomes unavailable, a virtually identical server mirroring the same data automatically comes online.

It will be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. An early-warning detection and notification network for monitoring dynamic environmental conditions comprising:
    (a) a plurality of remotely located environmental sensors having a communications uplink to a communication relay;
    (b) a downlink interface from said communication relay to a database server adapted to hold environmental condition data;
    (c) a communications interface between said database server and a data network wherein said sensors periodically upload environmental condition data to said communication relay and said downlink interface adapted to send environmental condition data to said database server, said communications interface providing access to said condition data through said data network;
    (d) a threshold notification means between said database server and an end user interface, said threshold notification means adapted to record at least one or more end-user-defined trigger levels for at least one or more environmental conditions whereby a notification signal is generated and transmitted when said at least one or more user-defined trigger levels is equal to or greater than the levels in data retrieved from said remotely located environmental sensor.

2. The early-warning detection and notification network for monitoring dynamic environmental conditions of claim 1, wherein said notification signal comprises an email message.

3. The early-warning detection and notification network for monitoring dynamic environmental conditions of claim 1, wherein said notification signal comprises a page.

4. The early-warning detection and notification network for monitoring dynamic environmental conditions of claim 1, wherein said notification signal comprises an automated voice message via telephone.

5. The early-warning detection and notification network for monitoring dynamic environmental conditions of claim 1, wherein said notification signal comprises an automated fax transmission.

6. The early-warning detection and notification network for monitoring dynamic environmental conditions of claim 1, wherein said notification signal is transmitted to a plurality of recipients.

7. The early-warning detection and notification network for monitoring dynamic environmental conditions of claim 1 further comprising a diagnostic uplink from said remotely located environmental senor, said diagnostic uplink transmitting sensor functionality status at predetermined intervals.

8. The early-warning detection and notification network for monitoring dynamic environmental conditions of claim 7, further comprising a diagnostic downlink to said remotely located environmental sensor wherein the functionality of said sensor may be remotely audited on command.

9. The early-warning detection and notification network for monitoring dynamic environmental conditions of claim 8, further comprising a command signal sent to said sensor when said at least one or more user-defined trigger levels is equal to or greater than the levels in data retrieved from said remotely located environmental sensor whereby the functionality of said sensor is confirmed prior to transmission of said notification signal.

* * * * *